No. 748,251.

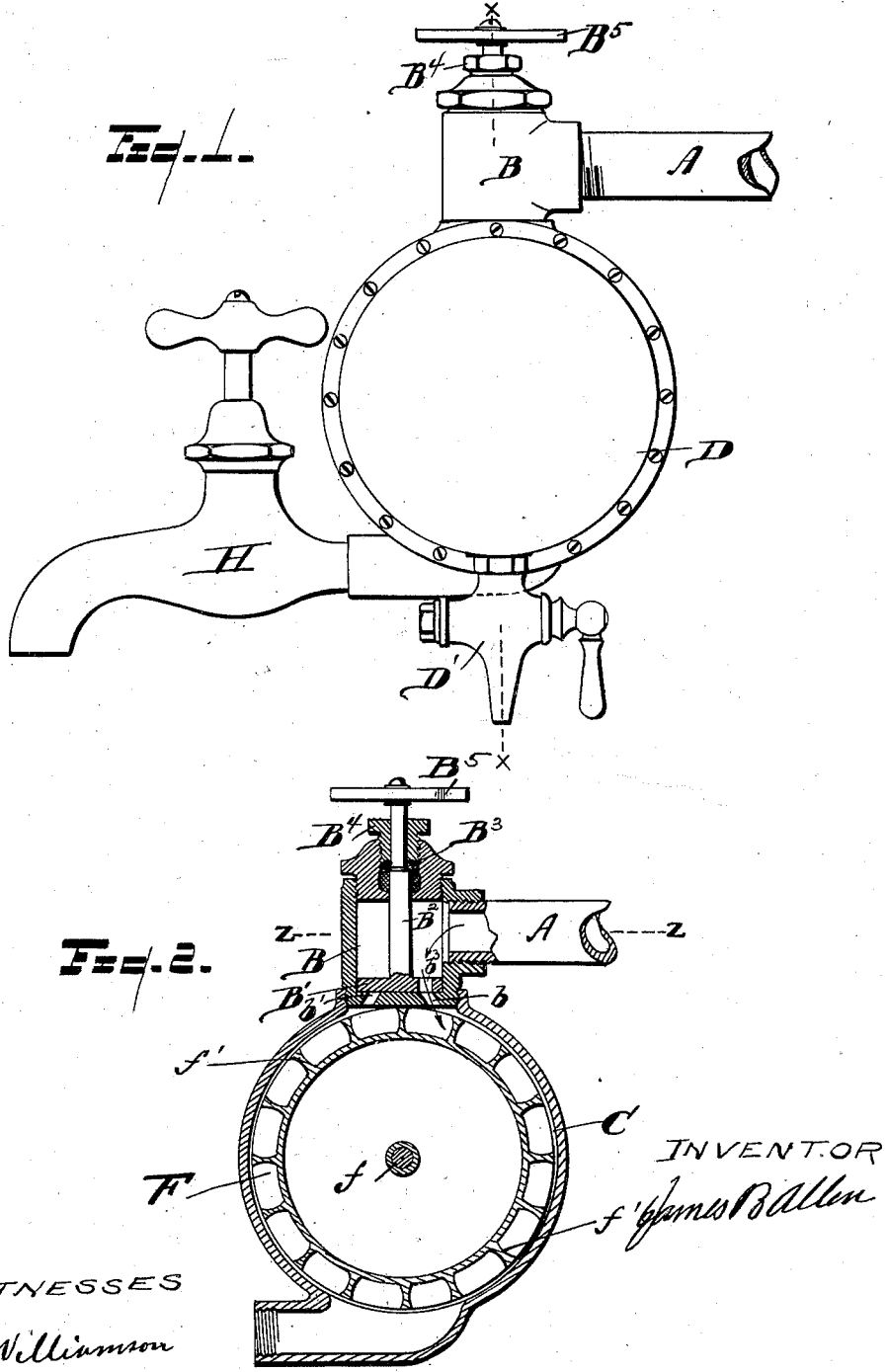

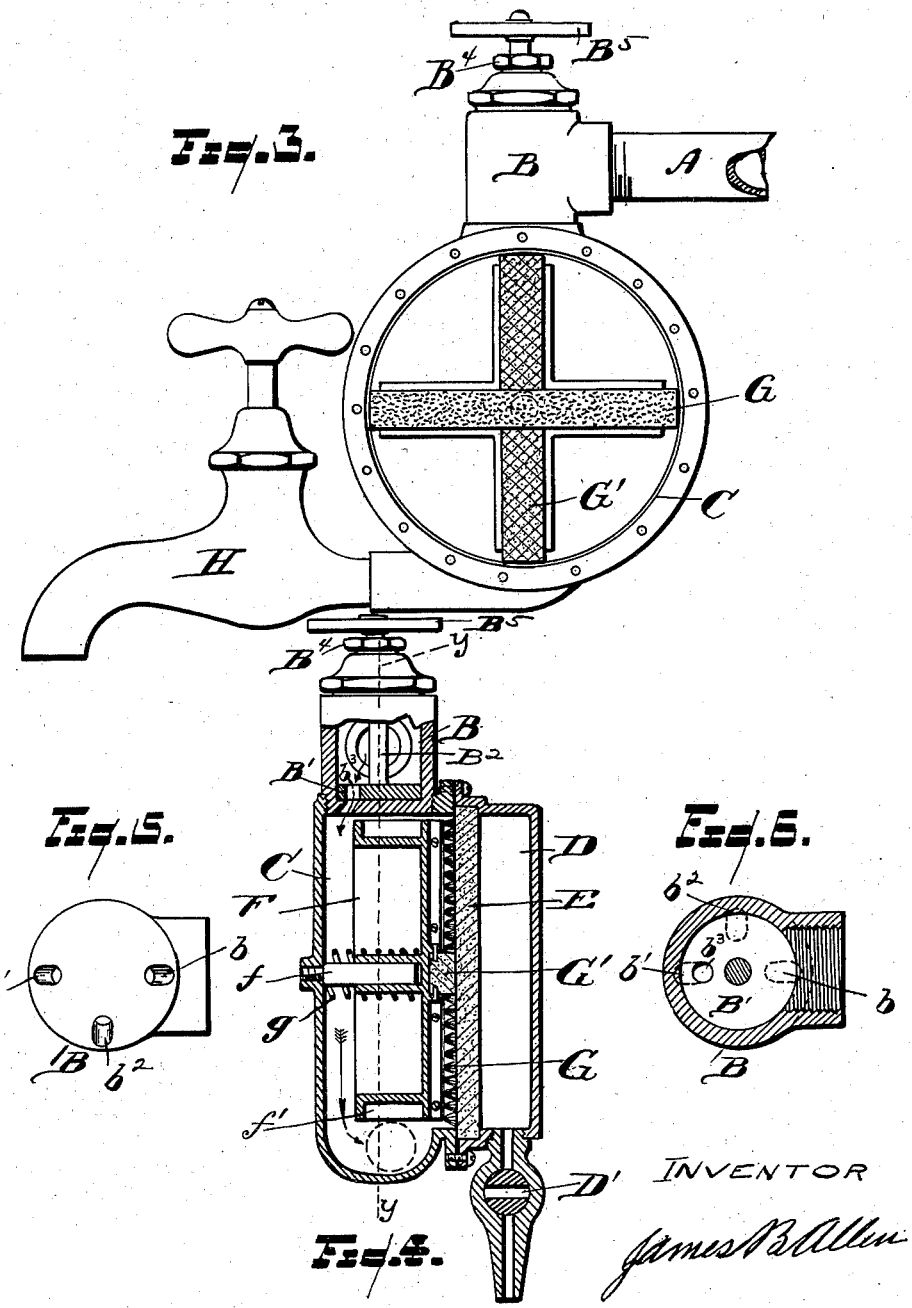

Patented December 29, 1903.

UNITED STATES PATENT OFFICE.

JAMES B. ALLEN, OF DETROIT, MICHIGAN.

FILTER.

SPECIFICATION forming part of Letters Patent No. 748,251, dated December 29, 1903.

Application filed May 14, 1903. Serial No. 157,127. (No model.)

*To all whom it may concern:*

Be it known that I, JAMES BENJAMIN ALLEN, of the city of Detroit, in the State of Michigan, have invented certain new and useful Improvements in Filters; and I do hereby declare the following to be a full, clear, and exact description of my said invention, such as will enable others skilled in the art to which it appertains to make and use the same.

My invention relates to an improvement in filters, shown in the accompanying drawings and more particularly set forth in the following specification and claims.

In the drawings, Figure 1 is a side elevation of my invention. Fig. 2 is a vertical sectional view on line Y Y of Fig. 4. Fig. 3 is a side elevation with the filter-chamber and filter-stone removed, exposing the arrangement of the cleaning-brushes. Fig. 4 is a vertical cross-sectional view on line X X of Fig. 1. Fig. 5 is an inverted view of the valve, showing the water-inlet ports. Fig. 6 is a cross-sectional view through the valve-chamber on line Z Z of Fig. 2, showing the inlet-ports below the valve in dotted lines.

My invention consists in the general arrangement of the parts, and one of its objects is to provide means for removing the foreign matter or scum which collects on the filtering medium through which the water passes for filtration. I attain this result by providing scouring-brushes operated by a motor driven by the water to be filtered. This motor is so arranged that it is capable of being driven in one direction and then instantly reversed in order that the brushes scouring the filtering medium may more effectively scour the same of all foreign matter.

Another object of the invention is to provide means whereby the unfiltered water may be drawn without causing the motor to rotate, which would result in unnecessarily wearing the brushes.

Other advantages and improvements will hereinafter appear.

Referring to the letters of reference shown on the drawings, A is the water-inlet pipe, connected with the source of supply.

B is a valve-chamber, and B' is a valve controlling the passage of water into the chamber C for unfiltered water.

D is a chamber for filtered water separated from the chamber C by the stone or other filtering medium E.

D' is a draw-off cock for the filtered water.

F is a turbine-wheel journaled on the shaft.

$f$ and G are scouring-brushes secured to the wall of the turbine. G' represents scouring-stones, also secured to the wall of the turbine.

$g$ is a spring having a bearing against the wall of the chamber C and the turbine-wheel, designed to force the brushes into contact with the filtering-stone. The turbine-wheel F is provided with double-concave buckets $f'$.

H is the draw-off faucet communicating with the chamber C.

The valve-chamber B is provided with three discharge-ports $b$, $b'$, and $b^2$, while the disk valve B' is provided with a single port $b^3$, designed to establish communication with the water-supply through the ports $b$, $b'$, and $b^2$, as may be desired. The valve-stem $B^2$ is provided with a shoulder $B^3$, against which the packing held by the packing-nut $B^4$ bears. The compressed packing bearing on the shoulder $B^3$ forces the disk valve B' in contact with the end wall of the valve. The operating-handle $B^5$ may be a straight bar or arrow for the purpose of indicating the position of the valve with reference to the ports $b$, $b'$, and $b^2$. The construction of the said valve in the above manner is very economical.

I will now proceed to describe the operation of my invention.

Water is admitted into the chamber C and it percolates through the diaphragm E into the filtering-chamber D in the usual way with filters of this description. When it becomes necessary to scour the side of the diaphragm exposed to the unfiltered water, the valve B' is turned so that the port $b^3$ will register with either of the ports $b$ or $b'$ and the valve H opened to permit the water to circulate through. This starts the turbine working, causing the brushes to scour the stone. It has been found, however, that by causing the brushes to rotate continually in one direction the stone is not thoroughly cleaned, but, on the other hand, foreign matter is forced into the pores of the stone, closing and defeating the rapid filtration of the water. To overcome this objection, I have provided means for reversing the motor, causing the brushes to rotate in the opposite direction. If, for example, water has been admitted through the port $b$ and the motor driven to the right and it is desired to reverse the movement of the motor, I turn the valve B' so that the port $b^3$ registers with the port $b'$. This causes the motor to reverse its movement and the scouring is carried on in the opposite direction, thus overcoming the tendency to close the pores of the stone, and thereby removing all foreign matter.

It is apparent that for many purposes unfiltered water is just as desirable as filtered, and the same can be drawn more rapidly. I have therefore provided means whereby the water may be drawn without causing the motor and brushes to rotate. This is accomplished by turning the valve B' so that the port $b^3$ will register with the port $b^2$, thereby deflecting the water back of the turbine and out through the faucet H.

I have shown the scouring-brushes in conjunction with scouring-stones. It is apparent, however, that either one or the other may be used, or both, as may be desired. The blades of the turbine may be straight or double concave, as shown. I prefer this form, as I find it to give greater efficiency.

While the valve B' will in actual service be in a position to freely admit water to the chamber C, the delivery of the unfiltered water being under the control of the faucet H it is apparent that the valve B' may be turned to entirely cut off the admission of water to the filter. This will be of advantage if it should become necessary to remove the chamber D for the purpose of getting at the turbine or brushes to make repairs.

Having thus described my invention, what I claim is—

1. In a filter, a chamber for unfiltered water, a chamber for filtered water, a filtering medium separating one from the other, means for drawing off the water from each of the chambers, a turbine mounted in the unfiltered chamber driven by the passage of water through the same, means for scouring the filtering medium driven by the turbine, and means for reversing the travel of the turbine, substantially as described.

2. In a filter, a chamber for unfiltered water, a chamber for filtered water, a filtering medium separating one from the other, valves controlling the discharge of water from each of said chambers, a turbine housed within the unfiltered-water chamber, means for scouring the filtering medium driven by said turbine, and the valve for controlling the passage of water to the turbine and unfiltered-water chamber, the construction being such that the water may be introduced to drive the turbine in one direction and then in the opposite direction as may be desired, substantially as described.

3. In a filter, an unfiltered-water chamber, a filtered-water chamber, a filtering-diaphragm separating said chambers, valves controlling the discharge of water from each of said chambers, a turbine housed within the unfiltered-water chamber, cleaning devices for scouring the filtering-diaphragm driven by said turbine, a valve to control the admission of water from the source of supply to the turbine, and unfiltered-water chamber, the construction being such that water may be admitted to drive the turbine in one direction and then admitted to drive it in the opposite direction, substantially as described.

4. In a filter, an unfiltered-water chamber, a filtered-water chamber, a filtering-diaphragm separating said chambers, valves controlling the discharge of water from each of said chambers, a turbine housed within the unfiltered-water chamber, cleaning devices for scouring the filtering-diaphragm driven by said turbine, a valve to control the admission of water from the source of supply to the turbine and unfiltered-water chamber, the construction being such that water may be admitted to drive the turbine in either direction or through the chamber without rotating the turbine, substantially as described.

5. In a filter, a chamber for unfiltered water, a chamber for filtered water, means for drawing the water off from both chambers, a filtering-diaphragm separating said chambers, a turbine mounted in the unfiltered chamber and driven by the water passing through said chamber, means for scouring said diaphragm driven by the turbine, said means consisting of a brush and scouring-stone and means for reversing the travel of the turbine, substantially as described.

In witness whereof I have hereunto set my hand in presence of two witnesses.

JAMES B. ALLEN.

Witnesses:
S. B. BEST,
ERNEST B. LANE.